US011484017B2

(12) United States Patent
Hajjar

(10) Patent No.: US 11,484,017 B2
(45) Date of Patent: Nov. 1, 2022

(54) FISHING LURE

(71) Applicant: Andrew Hajjar, Charlestown, MA (US)

(72) Inventor: Andrew Hajjar, Charlestown, MA (US)

(*) Notice: Subject to any disclaimer, the term of this patent is extended or adjusted under 35 U.S.C. 154(b) by 171 days.

(21) Appl. No.: 16/584,988

(22) Filed: Sep. 27, 2019

(65) Prior Publication Data
US 2020/0100482 A1 Apr. 2, 2020

Related U.S. Application Data

(60) Provisional application No. 62/737,312, filed on Sep. 27, 2018.

(51) Int. Cl.
*A01K 85/18* (2006.01)
*A01K 85/01* (2006.01)
*A01K 91/04* (2006.01)

(52) U.S. Cl.
CPC .............. *A01K 85/18* (2013.01); *A01K 85/01* (2013.01); *A01K 91/04* (2013.01)

(58) Field of Classification Search
CPC ........ A01K 85/18; A01K 85/16; A01K 85/01; A01K 91/03; A01K 91/04
USPC ...................................................... 43/42.09
See application file for complete search history.

(56) References Cited

U.S. PATENT DOCUMENTS

| | | | | | |
|---|---|---|---|---|---|
| 1,692,935 | A | * | 11/1928 | Heddon | A01K 85/18 43/42.15 |
| 2,739,407 | A | * | 3/1956 | Godsey | A01K 85/18 43/42.15 |
| 3,009,279 | A | * | 11/1961 | Jacobson | A01K 85/18 43/42.09 |
| 3,172,227 | A | * | 3/1965 | MacKey | A01K 85/18 43/42.09 |
| 3,942,280 | A | * | 3/1976 | Ryder | A01K 85/18 43/42.15 |
| 5,992,083 | A | * | 11/1999 | Deng | A01K 85/16 43/42.09 |
| 6,651,376 | B1 | * | 11/2003 | Link | A01K 85/01 24/698.3 |
| 7,107,719 | B1 | * | 9/2006 | Scott | A01K 85/00 43/42.09 |
| 7,114,284 | B2 | * | 10/2006 | Kato | A01K 85/18 43/42.15 |
| 9,345,237 | B2 | * | 5/2016 | Rapelje | A01K 85/16 |
| 10,327,428 | B2 | * | 6/2019 | Shirakawa | A01K 85/16 |
| 2005/0102884 | A1 | * | 5/2005 | Kato | A01K 85/18 43/42.15 |

(Continued)

*Primary Examiner* — Christopher P Ellis
(74) *Attorney, Agent, or Firm* — Prince Lobel Tye LLP; Brian M. Dingman

(57) ABSTRACT

A fishing lure with a head made of a hard plastic, a formed wire partially embedded in the head, wherein the wire is formed to have one or two adjacent loops in the front of the head, a loop at the top of the head, and a loop at the bottom of the head, a cavity in the rear portion of the head, a screw projecting out from the front wall of the cavity, and a soft plastic body that is configured to be attached to the head by screwing the body onto the screw. The front of the body fits into the cavity in the head. The body has a projecting male end at its front that presents a stub that is configured to be coupled to the screw, to attach the body to the head.

12 Claims, 2 Drawing Sheets

(56) References Cited

U.S. PATENT DOCUMENTS

| | | | |
|---|---|---|---|
| 2006/0143972 A1* | 7/2006 | Nichols | A01K 85/18 43/42.09 |
| 2012/0000111 A1* | 1/2012 | Griffin | A01K 85/00 43/42.09 |
| 2012/0311917 A1* | 12/2012 | Guennal | A01K 85/00 43/42.1 |
| 2014/0250763 A1* | 9/2014 | Hrncir | A01K 85/01 43/42.06 |
| 2017/0181415 A1* | 6/2017 | Szoke, Jr. | A01K 85/00 |
| 2018/0125047 A1* | 5/2018 | Gierl | A01K 85/18 |

* cited by examiner

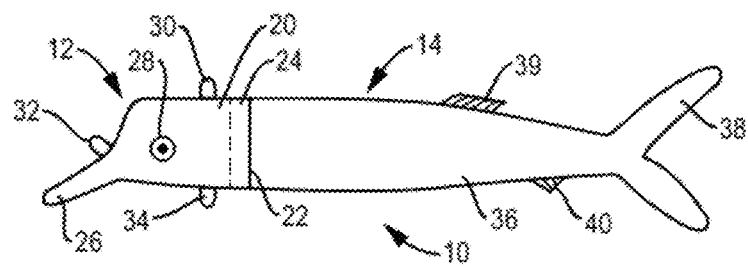
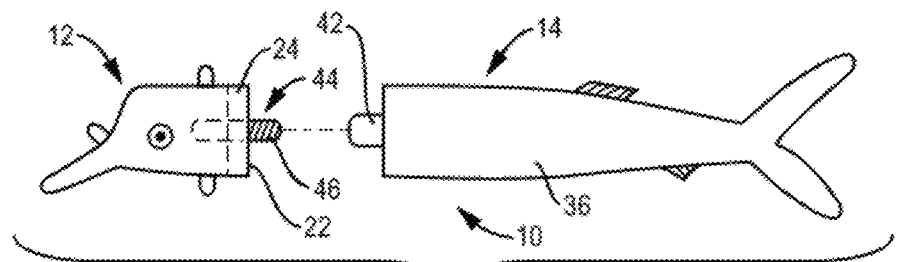
FIG. 1
FIG. 2
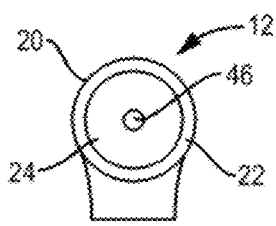 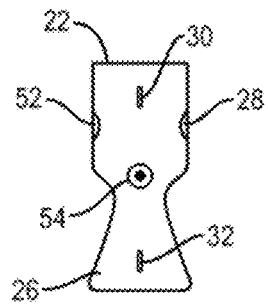 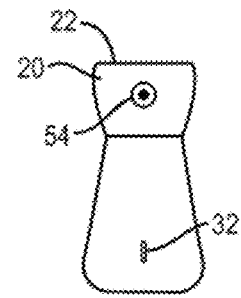
FIG. 3A　　　　　FIG. 3B　　　　　FIG. 3C
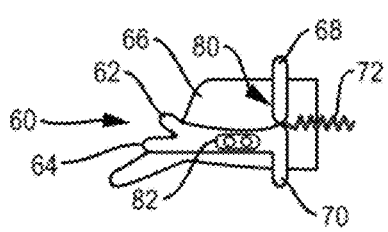 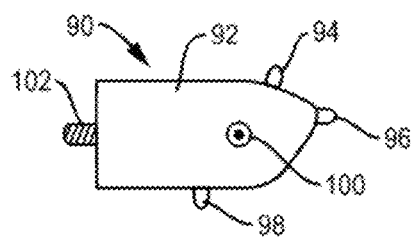
FIG. 4　　　　　FIG. 5
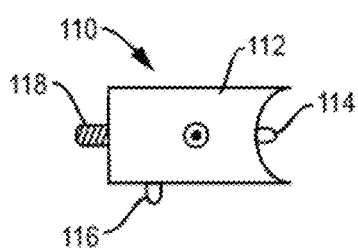 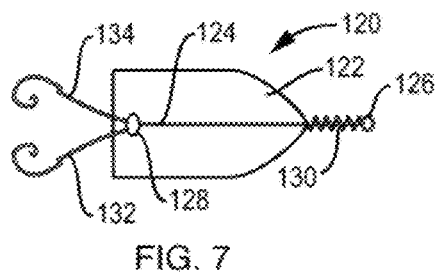 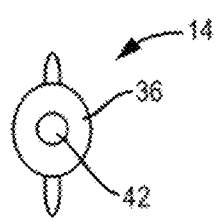
FIG. 6　　　　　FIG. 7　　　　　FIG. 8

FISHING LURE

CROSS-REFERENCE TO RELATED APPLICATION

This application claims the priority of Provisional Application 62/737,312 filed on Sep. 27, 2018, the entire disclosure of which is incorporated herein by reference.

BACKGROUND

This disclosure relates to a fishing lure.

Fishing lures are easily damaged, and are expensive to replace.

SUMMARY

All examples and features mentioned below can be combined in any technically possible way.

In one aspect a fishing lure includes a head made of a hard plastic. A formed wire is embedded in the head. The wire can be formed to have one or two adjacent loops projecting out from the head in the front of the head, and/or a loop projecting out from the head at the top of the head, and/or a loop projecting out from the head at the bottom of the head. There is a cavity in the rear portion of the head, with a screw projecting out from the front wall of the cavity. The lure also includes a soft plastic body that is configured to be attached to the head by screwing the body onto the screw. The front of the body fits into the cavity in the head. The body has a projecting male end at its front that presents a stub that is configured to be coupled to the screw, to attach the body to the head.

BRIEF DESCRIPTION OF THE DRAWINGS

FIG. 1 is a side view of a fishing lure.

FIG. 2 is an exploded view of the fishing lure of FIG. 1.

FIG. 3A is a rear view of the head of the fishing lure of FIGS. 1 and 2, FIG. 3B is a top view thereof, and FIG. 3C is a front view thereof.

FIG. 4 is a side transparent view of another head for a fishing lure.

FIG. 5 is a side view of another head for a fishing lure.

FIG. 6 is a side view of another head for a fishing lure.

FIG. 7 is a side transparent view of another head for a fishing lure.

FIG. 8 is an end view of the body for the fishing lure of FIGS. 1 and 2.

DETAILED DESCRIPTION

Figure 9:
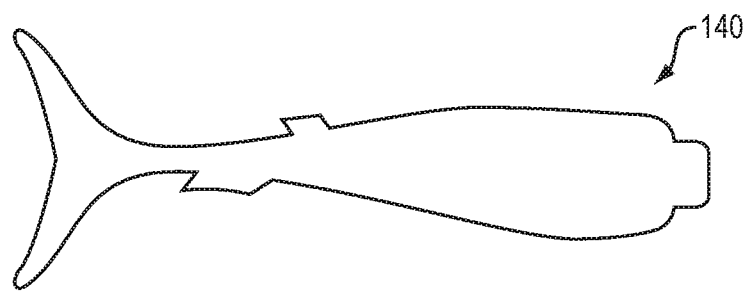
FIGS. 9-12 are side views of other styles of bodies for the fishing lure.

Featured in this disclosure is a fishing lure with a hard, rigid head and an easily replaceable soft body. The head can be made of a hard plastic such as urethane casting resin and/or clear resin. One or more formed wires or other metal structures are embedded in the head to create one or more of a line loop, one or more hook loops, and/or the screw. The wire(s) can be formed to create a loop in the front, a loop at the top, and a loop at the bottom. The loops can be used to attach fishing line or a leader or the like, and to attach one or more hooks of any style (such as single or treble hooks). The rear portion of the head has a cavity that the front of the body fits into. The cavity can have a desired depth, to mate with a particular body design. A typical depth might be about one-half inch, such that about a half inch of the body is located in the cavity. There is a screw projecting out (i.e., toward the back, where the body will be located) from the front wall of the cavity. The screw can be formed by the wire embedded in the head and be part of a frame created before the resin is poured. Or, the screw can be separate from the wire. The hardened resin encapsulates the wire(s) and the screw.

The body is configured to be attached to the head by screwing the body onto the projecting portion of the screw. The body can have a projecting male end at its front that presents a stub that can be coupled to the screw. The front end of the body is located inside the cavity. The body attachment design allows the body to be easily replaced as desired, for example if the body gets chewed up or a different size or style body is being added to the head. The body can be made from a soft plastic material, such as a silicone or the like.

The head can carry up to three eyes. There could be fewer than three or more than three. Two eyes can be on opposed sides of the head, and/or one can be on the top of the head. The head also can optionally include an embedded rattler. The rattler can be a hard glass or plastic tube with one or more loose hard (e.g., metal) balls inside; the balls move as the head moves and create a rattling sound that can attract fish.

Fishing lure 10 is shown in FIGS. 1-3. Fishing lure 10 includes separate head 12 and body 14. Head 12 is a molded plastic member 20 and includes one or more projecting loops or other types of connection points, to which hooks or leaders or lines can be attached as desired, and in a known manner. In this non-limiting example there are three loops—one in the front of the head (loop 32), one at the top of the head (loop 30) and one at the bottom of the head (loop 34). The loops are preferably but not necessarily all formed by a wire that is embedded in the head, as depicted in FIG. 4. The head can also include two or more eyes, typically with one each on the left and right sides of the head. An optional third eye can be on top of the head. See eyes 28, 52, and 54. This particular head includes a projecting diving or popping lip 26.

Body 14 comprises a one-piece molded or formed soft plastic member 36 that can define fins 39 and 40 and tail 38, to mimic a fish or other bait. See FIGS. 2 and 8. Projecting stub 42 is defined at the front of the body. It is sized, shaped and located such that it can be coupled to (i.e., screwed onto) projecting screw portion 46 of screw member 44 that is partially embedded in head member 20 and preferably projects beyond end face 22 of the head. See FIG. 2. Screw portion 44 would be sharp at its distal end, so that it can be embedded into stub 42, to fix the body to the head. The body is sized and shaped such that a small part of it is located in head cavity 24. This helps to create a tight fit of the body in the head.

In one non-limiting example, all of the loops projecting from the head are created using a single wire that is embedded in the head. However, multiple wires could be used (e.g., one for each loop). The wire(s) can be part of or entirely make up a metal form that is located in a mold in which the head plastic material is poured and hardens. FIG. 4 depicts wire 80 embedded in head 60 and having bends that form projecting loops 62, 64, 68, and 70. In this case screw 72 is also part of wire 80, but it need not be as it could be a separate screw or other attachment device. FIG. 4 also illustrates an optional rattler 82 that is a hard hollow tube with one or more loose hard balls inside of it that move and rattle as the head is moved, which can help attract fish.

FIG. 5 illustrates a different shape/type of head 90 with molded, hard plastic member 92, projecting loops 94, 96, and 98, and projecting screw 102. FIG. 6 illustrates a different shape/type of head 110 with molded, hard plastic member 112, projecting loops 114 and 116, and projecting screw 118. FIG. 7 illustrates a different shape/type of head 120 with molded, hard plastic member 122. In this case the head is configured to carry one or two trailing hooks 132 and 134. This is accomplished by embedding leader 124 in the body, with connector end 126 projecting from the front. A spring 130 is located over the leader as a means to keep the other end 128 of the leader in place tight against the back of the head. End 128 can be pulled back away from the head (against the pressure of the spring) to couple a hook to end 128.

Figure 10:
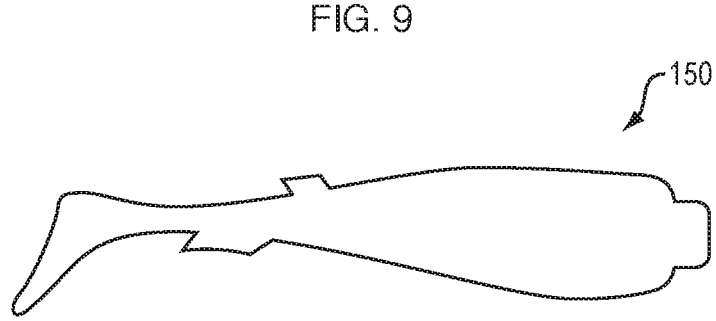
Figure 11:
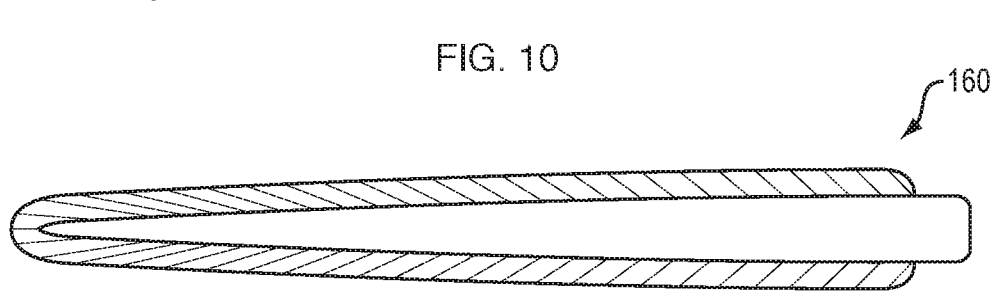
Figure 12:
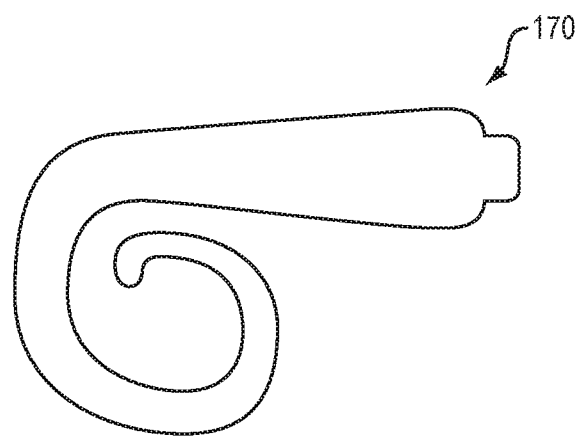

Different body types and shapes can be attached to any one of the heads. For example, fork tail fish variety 140, FIG. 9, paddle tail fish variety 150, FIG. 10, eel body variety 160, FIG. 11, and ribbon tail variety 170, FIG. 12. Other sizes, types and shapes of bodies can be accommodated, provided that each has a stub in the front and its front end is sized and shaped to be received into the rear cavity of the head.

A number of implementations have been described. Nevertheless, it will be understood that additional modifications may be made without departing from the scope of the inventive concepts described herein, and, accordingly, other examples are within the scope of the following claims.

What is claimed is:

1. A fishing lure, comprising:
   a head made of a hard plastic;
   one or more formed wires partially embedded in the head, wherein the one or more wires are formed so as to define one or more loops projecting from the head;
   a cavity in the rear portion of the head;
   a screw projecting out from a front wall of the cavity; and
   a soft plastic body that is configured to be attached to the head by screwing the body onto the screw, wherein the front of the body fits into the cavity in the head such that the front of the body is located in the cavity in the head, and wherein the body has a projecting male end that projects beyond the front of the body to present a stub that is configured to be coupled to the screw by embedding the screw in the stub.

2. The fishing lure of claim 1, wherein the head carries at least two eyes, with one eye on each of the two opposed sides of the head.

3. The fishing lure of claim 2, further comprising a third eye on the top of the head.

4. The fishing lure of claim 1, wherein the head further comprises an embedded rattler.

5. The fishing lure of claim 4, wherein the rattler comprises a hard glass or plastic tube with one or more loose balls inside.

6. The fishing lure of claim 1, wherein the one or more formed wires define a loop in the front of the head and a loop at the top of the head.

7. The fishing lure of claim 6, wherein the one or more formed wires further define a loop at the bottom of the head.

8. The fishing lure of claim 1, wherein the loops are configured to be coupled to a hook or a leader or a line.

9. The fishing lure of claim 1, comprising a single formed wire that defines all of the loops.

10. The fishing lure of claim 1, wherein the body defines a tail.

11. The fishing lure of claim 10, wherein the body further defines one or more fins.

12. The fishing lure of claim 1, wherein the screw comprises a corkscrew-shaped portion of a formed wire.

* * * * *